United States Patent [19]

Smith, 2nd.

[11] 4,215,346
[45] Jul. 29, 1980

[54] NAVIGATION UNIT HAVING TIME SHARED OPERATION

[75] Inventor: Frank P. Smith, 2nd., Dresher, Pa.

[73] Assignee: Narco Scientific Industries, Inc., Fort Washington, Pa.

[21] Appl. No.: 876,094

[22] Filed: Feb. 8, 1978

[51] Int. Cl.² ............................................. G01S 5/02
[52] U.S. Cl. ........................ 343/113 R; 343/106 R; 343/108 R
[58] Field of Search .......... 343/108 R, 108 M, 106 R, 343/106 D; 325/417, 420, 458, 466

[56] References Cited
U.S. PATENT DOCUMENTS

| | | | |
|---|---|---|---|
| 3,116,899 | 1/1964 | Jude et al. | 343/108 R |
| 3,634,862 | 1/1972 | Hiscox et al. | 343/108 R |
| 3,704,423 | 11/1972 | Kadron et al. | 325/458 |
| 3,742,130 | 6/1973 | Peil | 325/420 X |
| 3,750,177 | 7/1973 | Rooks | 343/108 R |
| 3,832,636 | 8/1974 | Kubo | 325/466 X |
| 3,967,278 | 6/1976 | Buehler et al. | 343/108 R |

Primary Examiner—Theodore M. Blum
Attorney, Agent, or Firm—Paul & Paul

[57] ABSTRACT

A navigational unit having a time-shared mode of operation for handling a plurality of different navigational signals is provided wherein IF components within the unit may have a dual dedication, i.e., used in common for handling all signals while normally present separate front end components and navigational display components may be dedicated exclusively to each separate signal, a central timing and control component coordinating the total operation.

11 Claims, 3 Drawing Figures

NAVIGATION UNIT HAVING TIME SHARED OPERATION

BACKGROUND OF THE INVENTION

This invention relates to navigational systems for use in aircraft and other means of transportation utilizing transmission and receiver devices for the handling of radio and radar information, this information being used to develop data needed to navigate the aircraft. This data may include direction of travel, distance to or from fixed reference points, and the measurement of azimuth.

In general aviation, the standard navigational system uses VHF OMNI Range network, commonly referred to as VOR, wherein the pilot of the aircraft can determine his bearing with reference to the location of selected VOR transmitters. The transmitters at various geographical locations operate on different VHF carrier frequencies, but each conveys a pair of 30 Hz signals which, when received by the aircraft, provide an indication of the angular position of the aircraft relative to the particular transmitter by means of the phase relationship of the signals. Ordinarily, one of the 30 Hz signals is established as a phase reference signal and is frequency modulated upon a subcarrier having a nominal frequency of 9,960 Hz, the subcarrier in turn being amplitude modulated upon the VHF carrier. The VOR station also transmits a CW radio signal through a rotating directional antenna such that a 30 Hz AM signal is provided in space at the recieiving aircraft. This AM signal has a varying phase for each degree of bearing away from a reference bearing chosen for the station. The reference bearing is due north. An aircraft receiving both the AM and FM signals contains a phase detector which detects the phase difference between the 30 Hz modulation carried by the AM and FM signals. This phase difference is measured in degrees and is a direct indication of the bearing of the aircraft relative to the reference phase of the VOR station.

Similarly, many aircraft are equipped with instrument landing systems (ILS). Such ILS systems are utilized as an aid to landing for instrument approach when the ceiling and visability are low. ILS as it exists today includes three basic ground station signals, which are (1) the localizer signals (LOC); (2) the glide slope signals (GS); and (3) the marker signals. Functionally, these elements provide lateral, vertical and longitudinal (distance) information respectively by which it is possible to navigate an aircraft from a prescribed approach altitude to a lower level close to the runway. From this lower level, usually 200 feet above the runway, the pilot is expected to see the runway or a system of approach lights so that the actual landing is accomplished by visual reference to the runway.

The "localizer" (LOC) defines a vertical plane of radiation created by generated signals which permits the aircraft to align with the centerline of the runway. The localizer signal has two modulation frequencies, 90 Hz and 150 Hz. The desired course is defined by equal amplitudes of each.

"Glide slope" (GS) is a signal at the right place and the proper angle from the initial approach plane to the plane of the runway which will enable the aircraft to make a proper landing. A typical glide slope angle is normally 3.0°, which is an angle generally satisfactory for all present day fixed wing aircraft. Two modulation frequencies, 90 Hz and 150 Hz are employed. The desired glide slope angle is defined by equal amplitudes of each. In the aircraft's receiver, the 150 Hz signal output would predominate below the glide slope and a 90 HZ output would predominate above the glide slope. A discriminator therefore is capable of putting out a signal which can be displayed to the pilot designating whether he is below or above the desired glide path. Again, as with the localizer, in the past special purpose equipment dedicated to processing glide slope information has typically been used in aircraft. This equipment has been connected to its own antenna which is capable of receiving 90 Hz and 150 Hz signals. A carrier frequency of 330 MHz is used which permits the use of a low antenna structure at the airport.

The ever continuing demand, however, to reduce the weight and space taken up by equipment carried on an aircraft makes it desirable to reduce the weight and size of the navigational unit avionics. The various individual systems comprising a total navigational unit carry within themselves a duplication of electronic components. While it may be conceivable to utilize common equipment which can be dedicated to handling of more than one type of signal, the actual implementation of such a system becomes quite complicated involving information rates of incoming signals, duty cycles of the shared components, and sequencing and control of the shared system.

An object of this invention is to provide a shared navigational unit wherein components common to more than one of the standard navigational systems are utilized on a shared basis having a plurality of dedications.

Another object of this invention is to provide a logic and control scheme for such a shared component navigational unit wherein a timing and control sequence permits processing of a plurality of information without detrimental delay to any one process and without the loss of any information.

A further object of this invention is to provide such a unit wherein the shared processing components are operated in such a manner that a beat frequency or false signal pertubation is not created.

An even further object of this invention is to provide such a unit where said time shared operation of said common components operation is multiplexed, where false signal outputs are inhibited during switching, and where detrimental stored historical information is destroyed during switching.

SUMMARY OF THE INVENTION

The objects of this invention are realized in a time-shared LOC and GS navigational unit receiver which may have common components for handling both LOC and GS information. Normal antenna and RF amplifier and RF mixer components, as well as navigational display components, may remain dedicated exclusively to LOC or GS information, while IF components, frequency synthesizer and output components may share dedication between signals on a multiplexed basis.

Multiplex operation may be governed by a timing and control circuit which directs the common components to alternately switch back and forth between a LOC information processing mode and a GS information processing mode.

Multiplex control pulses may be generated from the timing and control circuit to the frequency synthesizer and its associated voltage controlled oscillator (VCO), for directing mixing frequencies to either a LOC mixer of a GS mixer for controlling their operation. These multiplex control pulses may also be delivered to a LOC output and a GS output connected to individual displays for controlling the operation of these converters. Multiplex control pulses may be delivered to the IF common components, specifically, to an automatic gain control (AGC) for switching operation between a LOC signal mode and a GS signal mode.

An inhibit command may be generated by the timing and control circuit to define the switching time between LOC and GS signal modes during which the system may be reset and residual information dispensed. A signal build up time may be established after a switching time before an actual processing (sampling) of the respective LOC or GS signals begins.

DESCRIPTION OF THE DRAWINGS

The advantages, features and operations of the invention will be understood from a reading of the following detailed description of the invention in conjunction with the attached drawings in which like numerals refer to like elements and in which.

DETAILED DESCRIPTION OF THE INVENTION

An OMNI mode VOR/ILS localizer (VOR/LOC) receiver and an ILS glide slope (GS) receiver are incorporated into a single navigational unit, the various navigational signals (VOR/LOC and GS signals) being processed on a time-shared multiplexed basis to provide simultaneous displays of each as well as an audio output of Morse Code station identification to the pilot.

Figure 1:
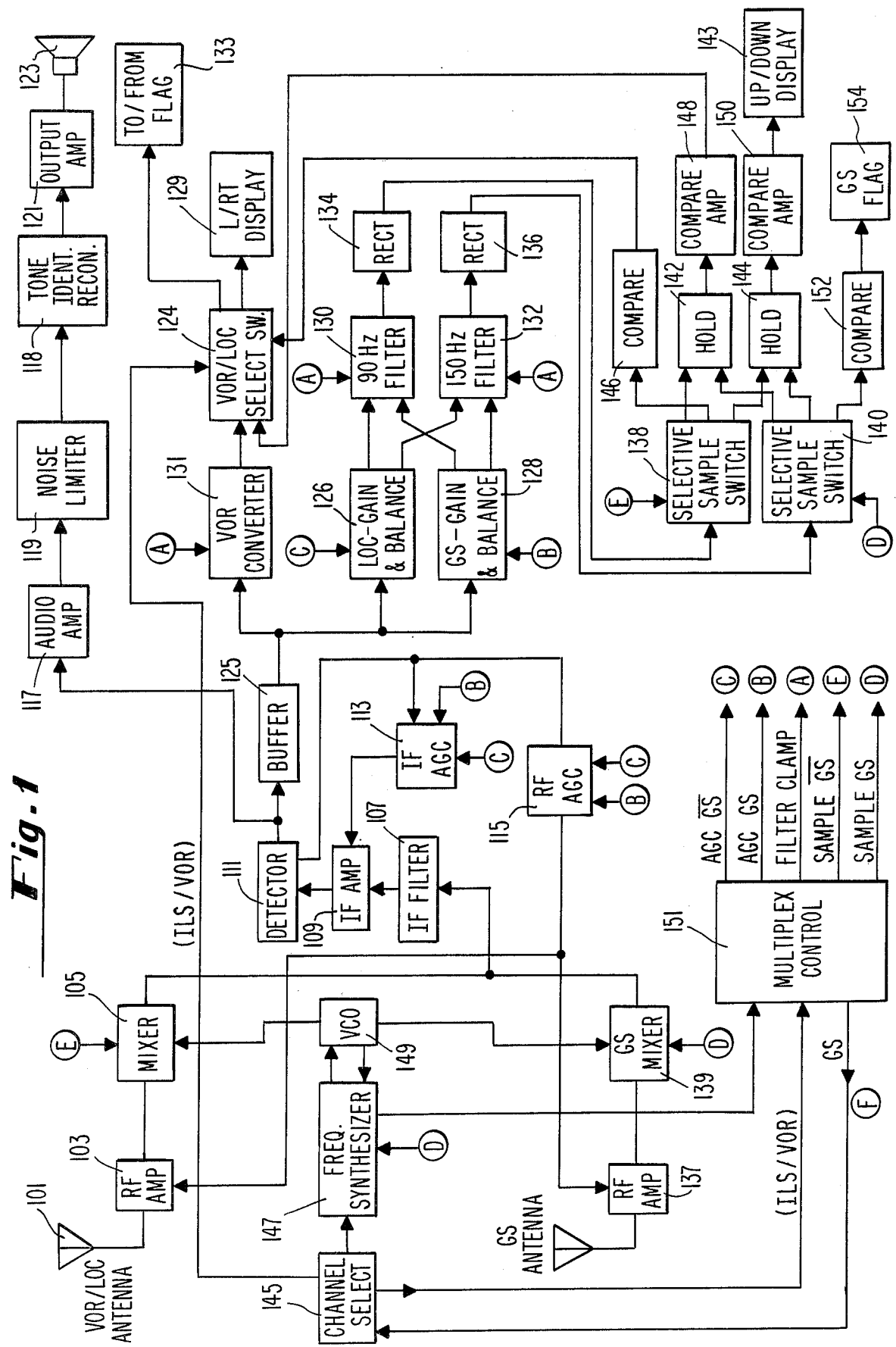
FIG. 1 is a block diagram of the time-shared navigational unit.

Referring to FIG. 1, navigation antenna 101 receives VOR/LOC information. This information is processed through an RF amplifier 103 and sent on to a VOR/LOC RF mixer 105. An IF filter 107 is connected to the output of this mixer 105 while an IF amplifier 109 is connected to the output of the filter 107. An amplitude detector 111 has its input connected to the output of the IF amplifier 109. An automatic gain control (AGC) is utilized for both the IF and RF stages wherein a feedback loop exists from the detector 111 via an IF AGC component 113 to the IF amplifier 109 and a feedback loop exists from the detector 111 to the RF amplifier 103 via an RF AGC component 115.

The output of the detector 111 is fed to an audio amplifier 117, then to a tone identification and reconstitution component 118, and then to a noise limiter 119 and to an output amplifier 121 which drives headphone or speaker amplifier 123.

The output from the detector 111 is also fed to a buffer 125 whose output is connected to a VOR converter 131 which is connected to a VOR/LOC select switch 24 and then to a "left/right" display 129. The output from the buffer 125 is also connected to an LOC gain and balance component 126 and a GS gain and balance component 128.

Gated outputs from the LOC gain and balance component 126 or the GS gain and balance component 128 are each connected to a 90 Hz filter 130 and a 150 Hz filter 132, and then to respectively connected rectifiers 134, 136.

A first selective sample switch 130 receives information from the 90 Hz signal rectifier 134 while a second selective sample switch 140 receives information from the 150 Hz signal rectifier 136. An output from each of these switches 138, 140 is connected to each of a first and second "hold" (storage) components 142, 144.

A third output from the first selective sample switch 138 is tied to VOR/LOC section switch 124 to a threshold comparison amplifier 146 which drives to "to/from" indicator flag 133 display.

A second comparison amplifier 148 is connected to the first hold component 142.

A third comparison amplifier 150 is connected to the second hold component 144, its output being used to drive an "up-down" display 143.

The second selective sample switch 140 also has a third output which is fed to another comparison amplifier 152 for driving a GS flag 154 display.

VOR/LOC selection switch 124 routes LOC or VOR information to "left/right" 129 or the "to/from" 133 display.

Glide slope information processed by the receiver output components described above may be received via GS antenna 135. A GS RF amplifier 137 is connected to this antenna 135. Connected to the output of the RF amplifier 137 is a GS mixer 139. The output of the GS mixer 139 is connected to an input of the IF filter 107 described above, and is in common with the output from the VOR/LOC mixer 105.

The RF AGC 115 feedback lines to the VOR/LOC RF amplifier 103 is also tied to the GS RF amp 137.

A channel selection control 145 can be employed to affect the operation of a frequency synthesizer 147 which in turn drives a voltage controlled oscillator (VCO) 149. Outputs from the voltage controlled oscillator 149 provide a local oscillator frequency signal (L.O.) to the VOR/LOC mixer 105 as well as to the GS mixer 139.

A multiplex control circuit 151 provides command signals for alternating the dedication of the common circuitry between the VOR/LOC mode and the GS mode and for directing the time-sharing within the entire receiver.

Multiplex control circuit 151 provides six basic control signal commands for operating the receiver. These command signals include a filter clamp command "A"; an AGC-GS command "B"; an AGC-$\overline{GS}$ command "C"; a sample GS command "D"; a sample $\overline{GS}$ command "E"; and a GS command "F", where "GS" signifies the glide slope information reception period and "$\overline{GS}$" signifies LOC information reception period. A time-share enable (an ILS channel selected)/disable (a VOR channel selected) signal is sent to the multiplex control circuit 151 from the channel select 145. The GS command signal is fed from the multiplex control 151 to the channel select 145 for synchronizing the control and therefore the change of operation of the frequency synthesizer 147 with the change of function between LDC and GS as generated by the multiplex control circuit 151.

The timing operation of the multiplex control circuit 151 is derived from a basic 50 KHz pulse train (clock) derived within the frequency synthesizer 147.

Multiplex control 151 output command signals "A," "B," "C," "D," "E," "F" timing pulses are distributed through out the navigational receiver unit as follows:

filter clamp "A" to VOR converter 131, 90 Hz filter 130 and 150 Hz filter 132; AGC GS "B" to IF-AGC 113, RF-AGC 115, GS gain and balance circuit 128; AGC-GS "C" to IF-AGC113, RF-AGC115, LOC gain and balance circuit 126; sample GS "D" to frequency synthesizer 147, GS mixer 139, second selective sample switch 140; sample $\overline{GS}$ "E" to LOC mixer 105, first selective sample switch 138; glide slope duty cycle GS "F" to channel select 145.

In addition to these commands an additional LOC channel switch command is fed to the VOR/LOC select switch 124 from the frequency synthesizer. This LOC channel switch commands activates the switch 124 to pass LOC information or OMNI mode. VOR information to the "left-right" and "to/from" display 129 as a function of the synthesizer 147 being tuned to a LOC or VOR channel, respectively.

Figure 2:
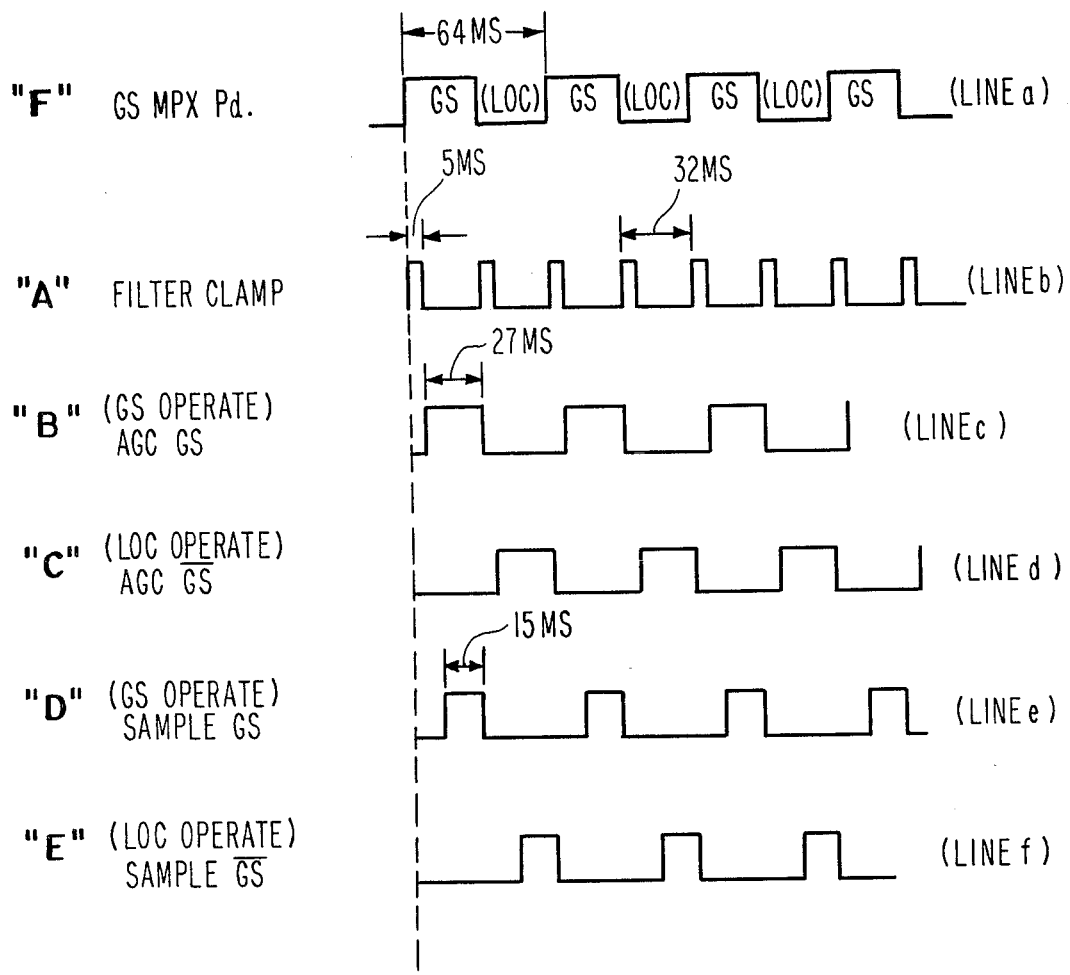
FIG. 2 is a timing diagram of the multiplex operation control signals provided by the timing and control circuitry within the unit.

Command signals "A", "B", "C", "D", "E", and "F" generated by the multiplex control circuit 151 are each rectangular pulse train sequences as shown in FIG. 2. The GS signal "F", line "a" of FIG. 2 defines a duty cycle for the processing of localizer and glide slope information as well as total multiplex period. Line "a" shows a 50% duty cycle for localizer and a 50% duty cycle for glide slope processing. A single total multiplex period is 64 milliseconds and was decided upon as a function of the design constraints imposed upon the system regarding information rates received as VOR, LOC, and GS signals, the capacities and speed of electronic components generally available, and the amount of electronic hardware permitted by the size and weight specifications for the unit.

Line "b" illustrates the filter clamp command "A", a series of five milliseconds pulses occurring at the beginning of each individual processing portion of the total multiplex period. These five milliseconds clamp pulses inhibit the processing of information during the first five milliseconds after a changeover between the LOC and GS processing modes. This allows for a five millisecond settling out time during which switching transients and other noise generated within the system are permitted to settle out and the system is reset to zero including the draining of charge from storage capactiors therein.

Lines "c" and "d" illustrate the command signals "B" and "C" respectively. These signals are used to control the dedication of the multiplex or common intermediate "components" within the navigational unit. As can be seen from FIG. 2 the AGC GS and AGC $\overline{GS}$ (LOC) signals are present during the entire remaining 27 milliseconds in the GS or LOC portions of a multiplex time period.

Lines "e" and "f" of FIG. 2 illustrate the commands "D" and "E", respectively, i.e. the commands for sampling GS information and sampling $\overline{GS}$ (LOC) information, respectively. It can be seen that these commands are present during the last 15 milliseconds of each respective GS and LOC processing time. The discontinuity of approximately 12 milliseconds allows for the intermediate components which have been switched over from processing one type of information to the other type to "build up", i.e. eliminate switching transients and fully sink into the new information processing mode while allowing time for correction of any saturation conditions which may have occurred upon switching. A safe 15 millisecond sample period is therefore reserved for obtaining GS and LOC navigational information for driving the respective navigational displays.

While in the embodiment presented herein VOR and LOC information is received on a common antenna 101 and processed through a separate RF amplifier 103 and mixer 105 before being fed to the common IF filter 107, and GS information is received on a separate antenna 135 and fed to a separate amplifier 137 and mixer 139 before being transmitted to the common IF filter 107, a multiplexed front end could easily be incorporated into the design. In such instance a compound antenna would feed a single RF amplifier and single RF mixer. The function of such a single RF amplifier and mixer could be enhanced to handle both the VOR/LOC and GS information received from the single compound antenna. Such a processing would be handled on a time-shared, multiplex bases and be controlled by multiplex control signals from the control circuitry 151.

The VOR/LOC mixer 105 is normally tuned to 40 channels within the 108 to 112 MHz range, while the GS mixer 139 is tuned to 40 channels within the 329 to 335 MHz range. The frequency synthesizer 147 switches a control signal to the voltage control oscillator 149 to change a local oscillator injection frequency between the LOC and GS ranges as a function of the sample command "D" received from the multiplexed control circuit 151. This L.O. injection frequency is 17 MHz below the LOC or GS channel frequency. Although the glide slope L.O. frequencies are 312 through 318 (17 MHz below 329 through 335), the synthesizer 147 operates at ⅓ the frequency (101 through 106 MHz), which means that the VCO mixer 105 operates within the VHF region for both outputs. The GS mixer 139 operates at triple the VCO 149 frequency, which is the 312 through 318 MHz UHF range. The GS mixer 139 is normally nonlinear and generates a third harmonic response from the synthesizer frequency.

Figure 3:
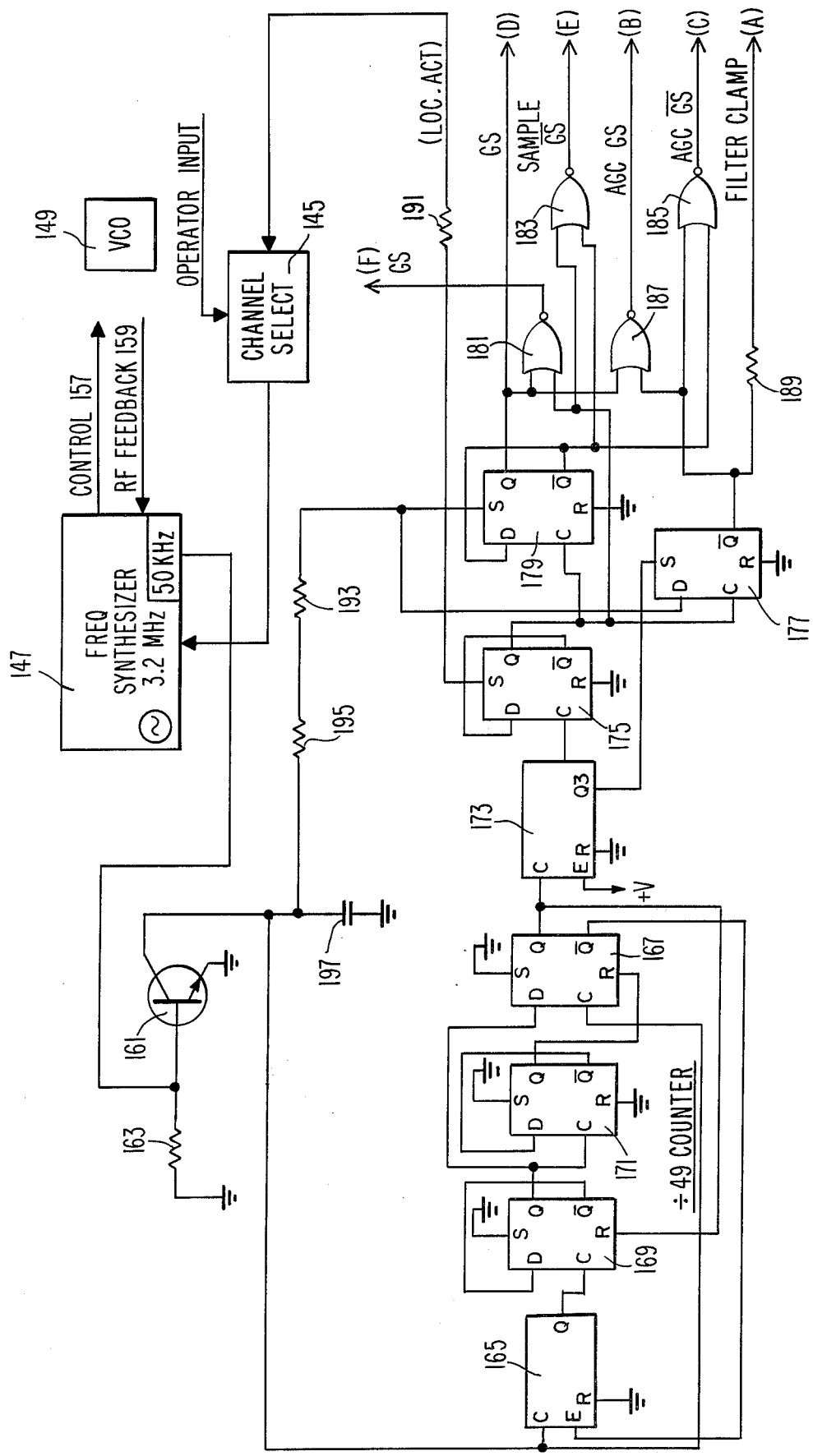
FIG. 3 is a circuit diagram of the timing and control circuitry which generates the command signals to affect the multiplex operation.

The structure of the timing and control circuit 151 as well as its interconnection to the rest of the receiver is shown in greater detail in FIG. 3. The basic switching control operation of the timing and control circuitry 151 is derived from a 50 KHz clock signal provided by the frequency synthesizer 147 which contains a 3.2 MHz crystal oscillator. The frequency synthesizer 147 also provides a control signal 157 to operate the voltage controlled oscillator (VCO) 149. VCO 149 provides an RF feedback signal 159 to the frequency synthesizer 147.

The 50 KHz signal received by the timing and control circuitry 151 is divided down by a divide by 49 counter and logic with the timing and control circuitry 151 to provide a basic 16 Hz repetition rate of the command signals "A", "B", "C", "D", "E" and "F". Specifically, FIG. 3, a connection from the 50 Hz output of the frequency synthesizer 149 to the base of a type 2N5134 transistor 161. The transistor 161 has its emitter tied directly to ground and its base tied to ground through a 10 K resistor 163. The collector of transistor 161 is connected to the clock input of a first type 4520 up-counter 165 and to the clock input of a first D-type flip flop 167. The "Q" output of this first D-type flip flop 167 is connected to the "E" input of the first up-counter 165. The "Q" output of this first counter 165 is connected to the "clock" input of a second D-type flip flop 169 while the "R" input to the up-counter 165 is connected to ground. Second D-type flip flop 169 has its "set" input tied to ground and its "$\overline{Q}$" output tied to its "D" input. The "Q" output of this second flip flop 169 is connected to the clock input of a third D-type flip flop 171 and to the "D" input of the first flip flop 167.

The "set" inputs to both the first and third flip flops 167 and 171 are connected to ground as well as is the "reset" input to the third flip flop 171. The "$\overline{Q}$" output of the third D-type flip flop 171 is connected to its "D" input while the "Q" output is connected to the "reset" of the first flip flop 167. The "Q" output of the first flip flop 167 is connected to the reset input of the second flip flop 169 and to the "clock" input of a second up-counter 173.

Up-counter 173 has its "E" input tied to the common logical "high", its "R" input tied to ground and its "Q" output tied to the "clock" input of a fourth D-type flip flop 175. The "Q3" output of the up-counter 173 is connected to the set input of a fifth D-type flip flop 177.

The "$\overline{Q}$" output of the fourth flip flop 175 is connected to its "D" input while the "Q" output of this flip flop 175 is connected to the "clock" input of the fifth flip flop 177 and to the "clock" input of a sixth D-type flip flop 179 as well as to one input of a two-input NAND gate 181. This first NAND gate 181 has its other input connected to the "Q" output of the sixth flip flop 179. Flip flop 179 has its "$\overline{Q}$" output connected to the "D" input as well as one input of a second two-input NAND gate 183 and a third two-input NAND gate 185. The "reset38 input to the fifth flip flop 177 is connected to ground as is the "reset38 input for the fourth flip flop 175 and the sixth flip flop 179. The "$\overline{Q}$" output of the fifth flip flop 177 is connected directly to one input of a fourth two-input NAND gate 187 and the other input of the third two-input NAND gate 185. The output of this third NAND gate 185 forms the "C" command signal (AGC-$\overline{GS}$). The Q output of this fifth flip flop 177 through a 100 K Ohm series resistor 189 forms the signal command "A" (filter clamp). The Q output of the sixth flip flop 179 forms the "D" command signal (GS) and is also connected to the other input of the first two-input NAND gate 181 and the other input of the fourth two-input NAND gate 187.

The output of the second NAND gate 183 forms the "E" command signal (sample $\overline{GS}$), while the output of the fourth NAND gate 187 forms the "B" command signal (AGC-GS) and the output of the first NAND gate 181 forms the GS command "F".

The "ILS selected" line coming from the channel select 145 is connected to the "set" input of the fourth flip flop 175 through a 100 K Ohm resistor 191. The "set" input of the sixth flip flop 179 and the "D" input of the fifth flip flop 177 are connected in common through a 47 K Ohm resistor 193 and a 15 K Ohm resistor 195 to the collector of the transistor 161. This collector of transistor 161 is also connected to ground through a 100 picofarad capacitor 197.

The time-shared multiplexed receiver as herein described provides common processing for both LOC and GS signals wherein the multiplex periods devoted for processing LOC and GS signals are each equal to 27 milliseconds. A 15 millisecond "sample time" is sufficient to capture information at the information rates of the signals. The 32 millisecond multiplex mode time reserved for each signal mode (and therefore a total cycle time of 64 milliseconds) is one of the "holes" in the frequency spectrum so that beat frequencies are not set up. It must be remembered that the receiver is dealing with 90 Hz and 15 Hz signals and there is a critical relationship between sampling time, and the generation of beat frequencies.

The filter clamp time of 12 milliseconds enables the circuitry to operate at faster multiplex rates, contrary to what might first be assumed, than if this "dead" time were not utilized. This filter clamp time permits time for resetting circuit components including the dissipation of residual stored information (charge on capacitors, etc) which enables the components to assume their new processing mode faster than if this filter clamp time was not employed.

Moreover an additional 15 millisecond period is used for "build up of energy". Actually what happens during this 15 millisecond period is that there is a build up of information on the components, i.e. capacitors charged to operating levels, voltage levels and voltage levels rise to operating levels. This 15 millisecond period is defined by the delay between as AGC GS pulse line e, FIG. 2 and a sample GS pulse line e, FIG. 2 or an AGC $\overline{GS}$ pulse, line d, FIG. 2, and sample $\overline{GS}$ pulse line f, and assures a very low probability of false information, FIG. 2 being produced by the receiver.

While the navigational unit described herein is directed to the preferred embodiment of the invention, changes can be made in this embodiment without departing from the spirit and scope thereof. This disclosure, therefore, should be considered in its intent, as illustrative, and should not be taken as all encompassing or in a limiting sense.

What is claimed is:

1. A navigational receiver having a time-shared mode of operation for simultaneously receiving a plurality of different navigational signals, comprising:
    means for receiving each said different signal;
    RF means associated with said receiving means for RF amplifying and RF mixing each said different signal;
    IF means for processing each said different signal by time-shared operation, said IF means being connected to said RF means, wherein said time-shared operation is on a multiplex basis of alternately processing first one of said different signals then another involving a processing dead time; and
    output means, being responsive to said IF means, for providing a display of navigational information.

2. The receiver of claim 1 wherein said change of dedication of said IF means from processing one of said different signals to processing another involves an IF means information buildup time immediately following each processing dead time.

3. A navigational receiver having LOC and GS signal receiving capabilities including LOC and GS antennas, a channel select control, a frequency synthesizer and associated voltage controlled oscillator (VCO) connected to said channel select control, 90 Hz and 150 Hz tone filters and displays means for providing LOC and GS output information, comprising:
    means for RF mixing said LOC signals, said LOC mixing means being connected to said LOC antenna and said VCO:
    means for RF mixing said GS signals, said GS mixing being connected to said GS antenna and said VCO:
    IF means common to both said LOC RF mixing means and said GS RF mixing means for processing both LOC and GS signals on a time-shared operational basis, said IF means feeding said 90 Hz and 150 Hz tone filters and said display means.

4. The receiver of claim 3, wherein said time-shared operation of said tone filters provide an alternating processing of LOC and GS signals on a multiplexed operational basis.

5. The receiver of claim 4 also including means for causing the multiplex operation to enhance the recovery of said IF means, said multiplex control mean being connected thereto and to said LOC and GS RF mixing means, to said 90 Hz and 150 Hz tone filters and to said output means controlling the operation thereof.

6. The receiver of claim 5 wherein said multiplex control means is also connected to said frequency synthesizer controlling the operation thereof.

7. The receiver of claim 6 wherein said 90 Hz and said 150 Hz tone filters each have a rectifier connected on their respective outputs and wherein said display means includes a pair of selective sample switches, each being connected to an ouput of a different one of said tone filter rectifiers and to said multiplex control means.

8. The receiver of claim 7 wherein said IF means includes:
- an IF filter connected in common to both said LOC RF mixing means and said GS RF mixing means;
- an IF amplifier associated with said IF filter;
- a detector connected to said IF amplifier;
- a buffer ties to said detector; and
- an IF automatic gain control component connected between said detector and said IF amplifier, the low pass capacitors of which are dedicated to each said different signal, being connected to said multiplex control.

9. The receiver of claim 8 also including:
- a LOC gain and balance component connected between said buffer and both said 90 Hz and said 150 Hz tone filters;
- a GS gain and balance component connected between said buffer and both said 90 Hz and said 150 Hz tone filters; and
- wherein said Loc gain and balance component and said GS gain and balance component are each connected to said multiplex control.

10. The receiver of claim 9 also including:
- a first RF amplifier connected between said LOC antenna and said LOC RF mixer;
- a second RF amplifier connected between said GS antenna and said GS RF mixer; and
- an RF automatic gain control connected between said detector and said first and second RF amplifiers, the low pass capacitors of which are dedicated to each said different signal, said RF automatic gain control being connected to said multiplex control.

11. The receiver of claim 10 wherein said multiplex control directs the operation of said frequency synthesizer and said LOC and GS mixers to perform the multiplexing of signals.

* * * * *

UNITED STATES PATENT OFFICE
CERTIFICATE OF CORRECTION

Patent No. 4,215,346    Dated July 29, 1980

Inventor(s) Frank P. Smith, 2nd

It is certified that error appears in the above-identified patent and that said Letters Patent are hereby corrected as shown below:

Column 7, lines 24 and 25, "reset38" should be --"reset"--.
Column 7, line 63, "15 Hz" should be --150 Hz--.
Column 9, line 21, "ties" should be --tied--.

Signed and Sealed this

Twentieth Day of January 1981

[SEAL]

Attest:

Attesting Officer

RENE D. TEGTMEYER

Acting Commissioner of Patents and Trademarks